United States Patent
Katayama et al.

(10) Patent No.: US 6,445,807 B1
(45) Date of Patent: *Sep. 3, 2002

(54) IMAGE PROCESSING METHOD AND APPARATUS

(75) Inventors: Akihiro Katayama, Yokosuka; Shinji Uchiyama, Yokohama; Masahiro Shibata, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,093

(22) Filed: Mar. 18, 1997

(30) Foreign Application Priority Data

Mar. 22, 1996 (JP) ............................................... 8-066245
Jul. 9, 1996 (JP) ............................................... 8-179078

(51) Int. Cl.$^7$ ................................................. G06K 9/00
(52) U.S. Cl. ........................ 382/100; 382/154; 348/39; 345/427
(58) Field of Search ............................... 382/325, 113, 382/131, 132, 100, 153, 154; 345/418, 419, 425, 427, 139, 568, 581, 607; 356/3.02, 3.07, 3.09, 3.1, 3.12, 12, 13; 348/37, 39, 44, 47, 48, 49, 50

(56) References Cited

U.S. PATENT DOCUMENTS

| | | | |
|---|---|---|---|
| 4,865,423 A | * 9/1989 | Doi | 350/320 |
| 5,073,819 A | * 12/1991 | Gates et al. | 348/140 |
| 5,325,472 A | * 6/1994 | Horiuchi et al. | 345/427 |
| 5,420,788 A | * 5/1995 | Vissers | 378/10 |
| 5,613,048 A | * 3/1997 | Chen et al. | 395/119 |
| 5,703,961 A | * 12/1997 | Rogina et al. | 382/154 |
| 5,710,875 A | * 1/1998 | Harashima et al | 345/419 |
| 5,796,386 A | * 8/1998 | Lipscomb | 345/156 |
| 5,933,146 A | * 8/1999 | Wrigley | 345/420 |
| 6,009,188 A | * 12/1999 | Cohen et al. | 382/154 |

OTHER PUBLICATIONS

A. Katayama, et al., "A Viewpoint Dependent Stereoscopic Display Using Interpolation of Multi–View Point Images", Proceedings of the SPIE, vol. 2409, pp. 11–20 (Feb. 7, 1995).
A. Appel, et al., "Computer Display System", IBM Technical Disclosure Bulletin, vol. 15, No. 10, pp. 3285–3286 (Mar. 1973).

\* cited by examiner

*Primary Examiner*—Yon J. Couso
(74) *Attorney, Agent, or Firm*—Fitzpatrick, Cella, Harper & Scinto

(57) ABSTRACT

The images of an object taken at a plurality of viewpoint positions are input together with information indicating the plurality of viewpoint positions, and the viewpoint position of an observer is detected. One of the input images is selected on the basis of the detected viewpoint position of the observer, and the scan line of the image is determined in accordance with the viewpoint position of the observer and the viewpoint position upon taking the selected image, thereby generating an image from the viewpoint position of the observer. In this manner, distortion of the image to be generated is suppressed. On the other hand, input multi-viewpoint images are converted into light rays that travel in a space, and each light ray is stored in a light space corresponding to a plane, which is one of a plurality of radially arranged reference planes and has an angle the plane makes with the light ray, which angle is closest to right angles. On the basis of the image, pixel positions, and pixel values calculated from the stored light rays, a desired image is generated, thereby broadening the observation range within which movement of the viewpoint position is allowed, and suppressing the required data volume.

19 Claims, 13 Drawing Sheets

LIGHT INTENSITY
$f(x, y, z, \phi, \psi)$

DEFINITION OF $(\phi, \psi)$

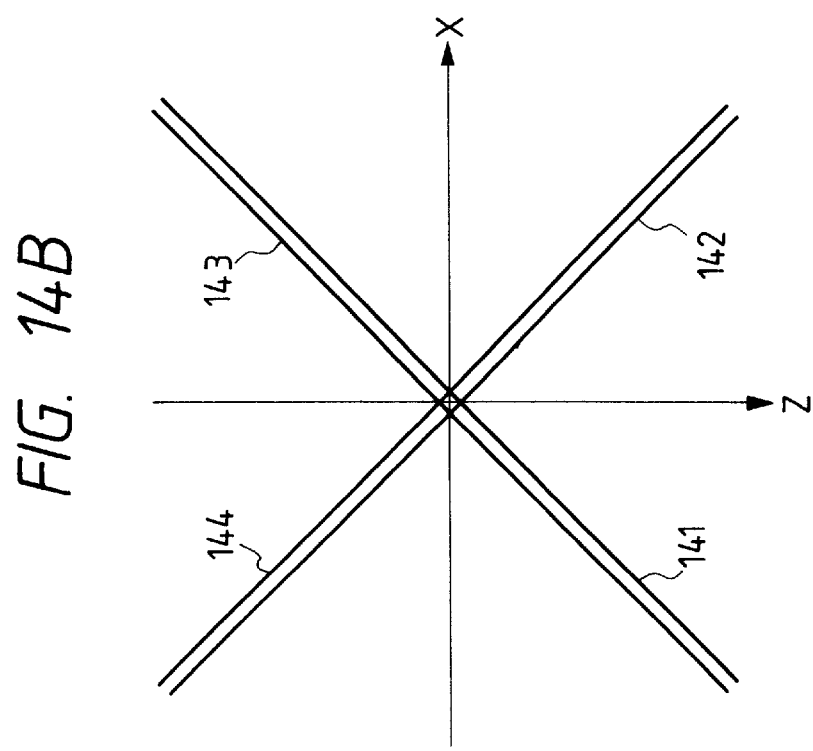
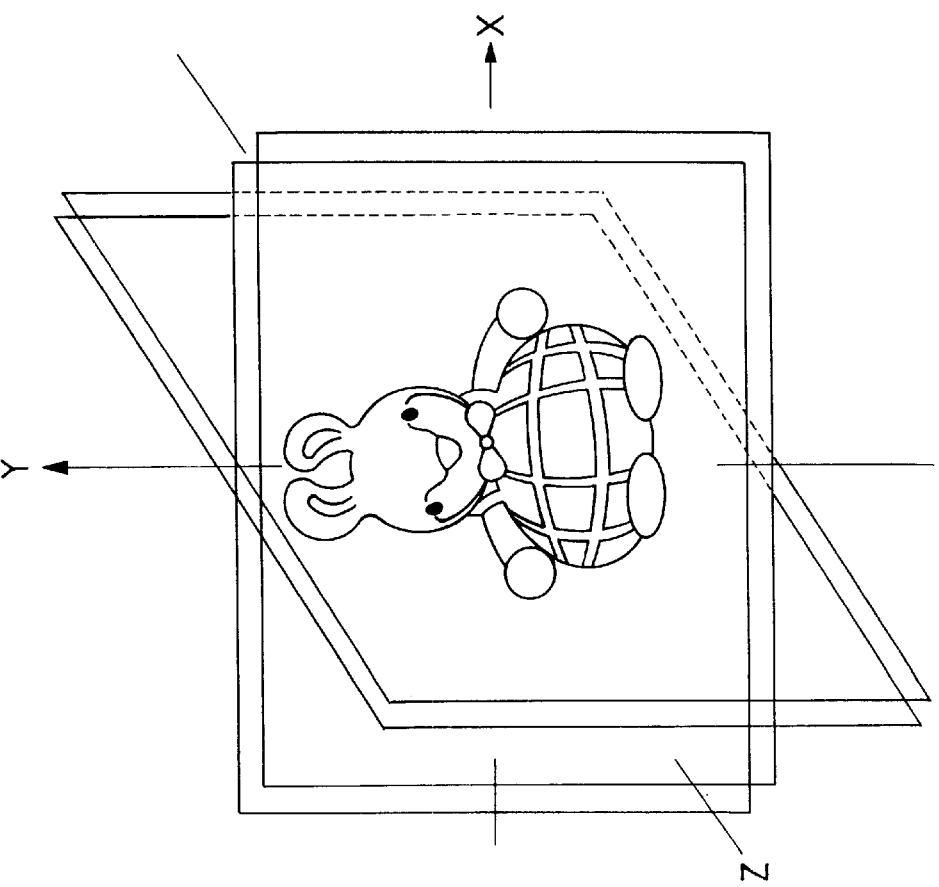

IMAGE PROCESSING METHOD AND APPARATUS

BACKGROUND OF THE INVENTION

1. Field of the Invention

The present invention relates to an image processing method and apparatus, which generate and output an image at the viewpoint position of the observer on the basis of a plurality of input images at different viewpoints.

2. Related Background Art

In a conventional method, in order to generate an image observed at a position other than the viewpoint position of the image from a plurality of images, the three-dimensional shape or the like of an object is temporarily reconstructed using, e.g., stereoscopic distance measurements, and an image observed from the new viewpoint position is generated using the reconstructed shape.

However, it is generally difficult to calculate the three-dimensional shape of an object from actually taken images. If the object has a simple shape, its shape may be reconstructed by calculating corresponding points by, e.g., stereoscopic distance measurements, but it is nearly impossible for natural objects such as trees having complex shapes to attain such reconstruction. Therefore, the method of calculating the three-dimensional shape and generating an image at a new viewpoint position based on the calculated shape cannot be used for such natural objects.

SUMMARY OF THE INVENTION

It is, therefore, an object of the present invention to provide an image processing method and apparatus, which generate an image at an arbitrary viewpoint position, which suffers less distortion, from images taken at a plurality of viewpoint positions.

It is another object of the present invention to provide an image processing method and apparatus, which can assure a broad observation range that allows movement of the viewpoint, and can suppress an increase in required data volume even in such case.

In order to achieve the above objects, the present invention comprises:

image input means for inputting images of an object taken at a plurality of viewpoint positions together with information indicating the plurality of viewpoint positions;

viewpoint position detection means for detecting a viewpoint position of an observer;

selection means for selecting an image from the images input by the image input means on the basis of the viewpoint position detected by the viewpoint position detection means;

image generation means for generating an image at the viewpoint position detected by the viewpoint position detection means on the basis of the image selected by the selection means in accordance with the viewpoint position detected by the viewpoint position detection means and the viewpoint position upon taking the image selected by the selection means; and image display means for displaying the image generated by the image generation means.

Also, the present invention comprises:

the image input step of inputting images of an object taken at a plurality of viewpoint positions together with information indicating the plurality of viewpoint positions;

the viewpoint position detection step of detecting a viewpoint position of an observer;

the selection step of selecting an image from the images input in the image input step on the basis of the viewpoint position detected in the viewpoint position detection step;

the image generation step of generating an image at the viewpoint position detected in the viewpoint position detection step on the basis of the image selected in the selection step in accordance with the viewpoint position detected in the viewpoint position detection step and the viewpoint position upon taking the image selected in the selection step; and the image display step of displaying the image generated in the image generation step.

Furthermore, the present invention comprises:

multi-viewpoint image input means for inputting a plurality of images having different viewpoint positions as multi-viewpoint image data;

image conversion means for converting the input multi-viewpoint image data into light rays that travel in a space;

light ray recording means for recording each of the converted light rays as light space data on a light space corresponding to a plane which is one of a plurality of radially arranged reference planes, and has an angle the plane makes with the light ray, which is closest to right angles;

viewpoint position and direction of line of sight input means for inputting a viewpoint position and a direction of line of sight of an image to be generated;

image calculation means for calculating an image required for determining each pixel value from the light space data in units of pixels of the image to be generated;

pixel position calculation means for calculating a position of a required scan line and a pixel position in the scan line in the light space data;

pixel value determination means for determining each pixel value of the image to be generated;

image generation means for generating a desired image on the basis of the calculated image, the pixel positions, and the pixel values; and display means for displaying the generated image on a display screen.

Moreover, the present invention comprises:

the multi-viewpoint image input step of inputting a plurality of images having different viewpoint positions as multi-viewpoint image data;

the image conversion step of converting the input multi-viewpoint image data into light rays that travel in a space;

the light ray recording step of recording each of the converted light rays as light space data on a light space corresponding to a plane which is one of a plurality of radially arranged reference planes, and has an angle the plane makes with the light ray, which is closest to right angles;

the viewpoint position and direction of line of sight input step of inputting a viewpoint position and a direction of line of sight of an image to be generated;

the image calculation step of calculating an image required for determining each pixel value from the light space data in units of pixels of the image to be generated;

the pixel position calculation step of calculating a position of a required scan line and a pixel position in the scan line in the light space data;

the pixel value determination step of determining each pixel value of the image to be generated;

the image generation step of generating a desired image on the basis of the calculated image, the pixel positions, and the pixel values; and the display step of displaying the generated image on a display screen.

BRIEF DESCRIPTION OF THE DRAWINGS

FIGS. 14A and 14B are explanatory views of the case which uses four reference planes, that are radially arranged to express the light space of the image processing apparatus of the fourth embodiment;

DETAILED DESCRIPTION OF THE PREFERRED EMBODIMENTS

The preferred embodiments of the present invention will be explained hereinafter with reference to the accompanying drawings.

Figure 1:
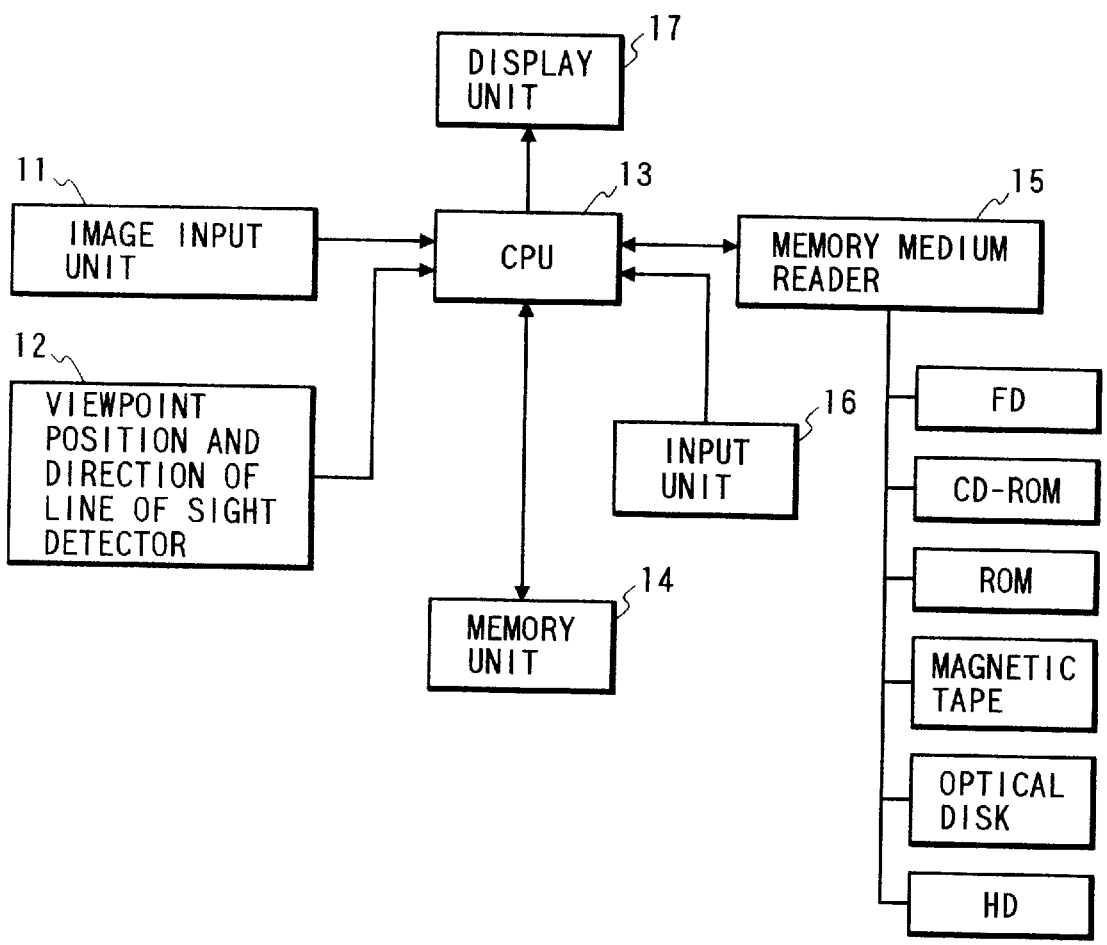
FIG. 1 is a block diagram showing the arrangement of an image processing apparatus according to the first embodiment of the present invention.

(a) First Embodiment:

FIG. 1 is a block diagram showing the arrangement of an image processing apparatus of the first embodiment, and showing the arrangement of the overall system of the apparatus of this embodiment. Referring to FIG. 1, an image input unit 11 inputs multi-viewpoint images obtained by taking images of an object from a plurality of viewpoint positions. The image input unit 11 may comprise a plurality of image sensing systems or may obtain multi-viewpoint images by moving an image sensing system. A central processing unit (CPU) 13 comprises a microprocessor for executing various kinds of processing (to be described later) in accordance with the processing procedures pre-stored in a memory unit 14, which comprises a ROM, hard disk, or the like for storing programs and data for controlling the CPU 13. A memory medium reader 15 reads programs and data stored in an FD (floppy disk), HD (hard disk), CD-ROM, ROM, magnetic tape, optical disk, and the like. An input unit 16 inputs commands and data to the CPU 13. A display unit 17 serves as a monitor for displaying various kinds of information and associated information during or after the processing of the CPU 13. A viewpoint position and direction of line of sight detector 12 detects the viewpoint position and the direction of line of sight of the observer. The viewpoint position and direction of line of sight detector may comprise a known one.

Figure 2:
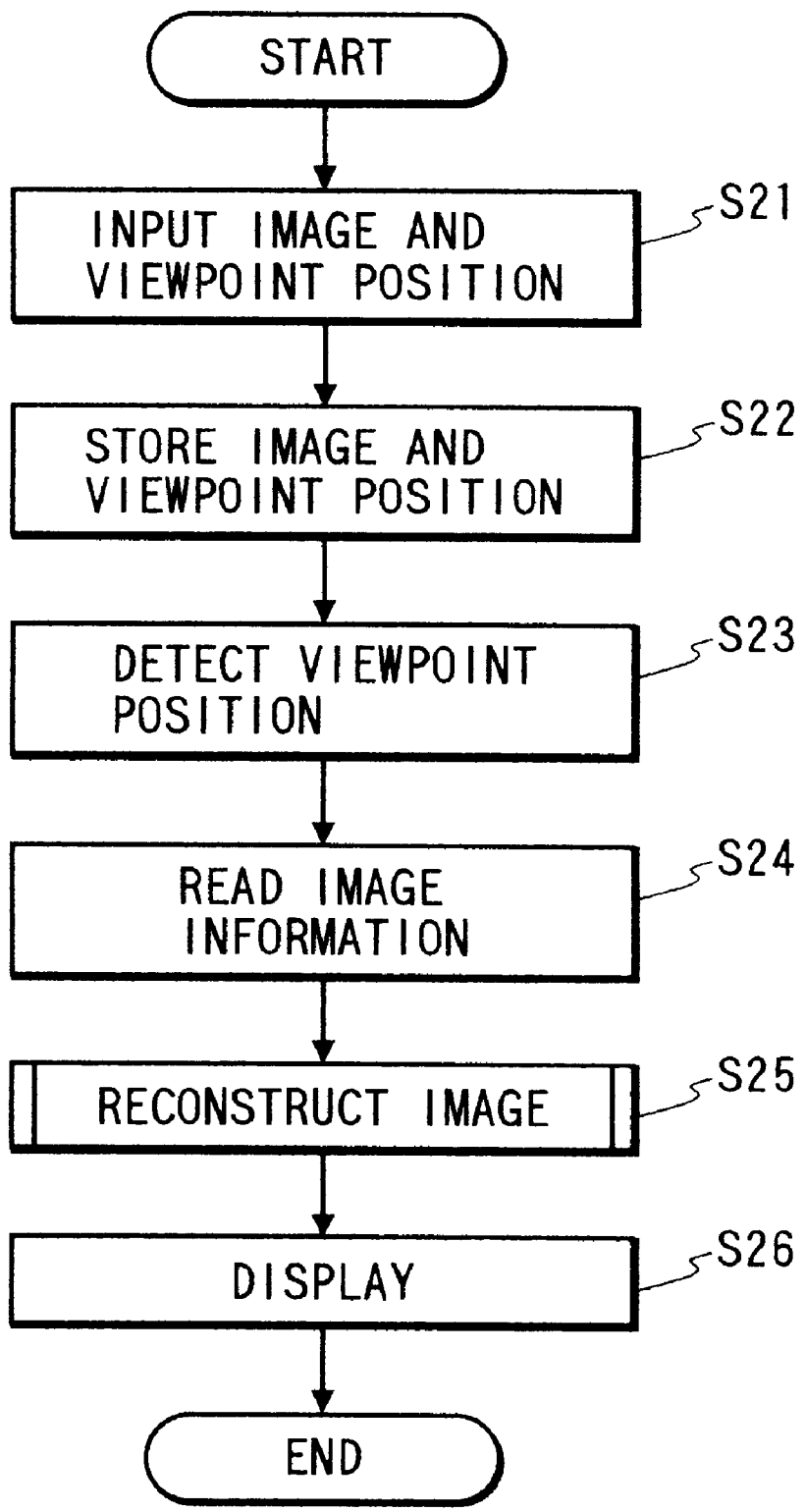
FIG. 2 is a flow chart showing the flow of the processing of the image processing apparatus of the first embodiment.

FIG. 2 is a flow chart showing the basic processing of the image processing apparatus of the first embodiment. This processing is executed by the CPU 13.

The CPU 13 executes processing in accordance with the processing procedures (programs) stored in the memory unit 14.

In the flow chart in FIG. 2, when the processing starts, the image input unit 11 inputs multi-viewpoint images taken at multi-viewpoint positions arranged in line, and the viewpoint positions of the image input unit 11 at which these multi-viewpoint images are taken are detected and read, in step S21. In step S22, these multi-viewpoint images and their viewpoint position information are stored in the memory unit 14 in correspondence with each other.

In step S23 and the subsequent steps, the processing for reading out the multi-viewpoint image data and the viewpoint position data of the observer upon taking these images and reconstructing an image observed from an arbitrary viewpoint position is executed.

In step S23, the viewpoint position and direction of line of sight detector 12 detects the viewpoint position and the direction of line of sight of the observer who observes the screen of the display unit 17 as a monitor. In step S24, multi-viewpoint image data are read out from the memory unit 14 on the basis of the detected viewpoint position information. In step S25, an image to be observed from the viewpoint position is reconstructed using the readout multi-viewpoint image data. In step S26, the reconstructed image observed from the arbitrary viewpoint position is displayed on the display unit 17.

Note that a single image corresponding to the viewpoint position of the observer is reconstructed in this case. If images corresponding to the positions of the right and left eyes of the observer are generated, a stereoscopic image can be displayed.

When a plurality of images are concurrently reconstructed, stereoscopic viewing can be attained using a lenticular display or the like even when the observer changes his or her viewpoint position.

Note that the above-mentioned program may be stored in a memory medium such as an HD (hard disk), FD (floppy disk), CD-ROM, ROM, magnetic tape, or the like, may be read out by the memory medium reader 15, and may be stored in the memory unit 14.

The image reconstruction processing in step S25 in the flow chart in FIG. 2 will be explained in detail below.

Figure 3:
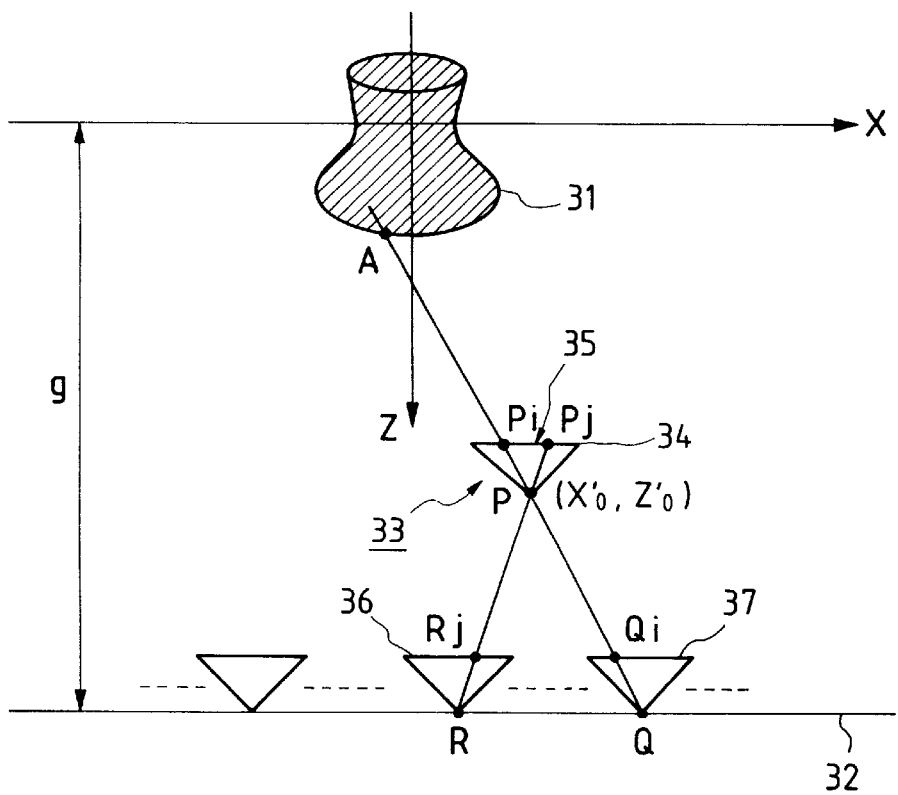
FIG. 3 is a view showing the principle of reconstructing an image from images input by an image input unit of the image processing apparatus of the first embodiment.

FIG. 3 shows the principle of reconstructing an image from an arbitrary viewpoint position using multi-viewpoint images input by the image input unit 11 of the image processing apparatus according to the first embodiment.

FIG. 3 illustrates an object 31, a line 32 with projection viewpoints, which line connects the image sensing positions of a plurality of input images (phototaking positions of a camera), a virtual camera 33 set at an arbitrary observation position P ($x'_0$, $z'_0$), an image sensing plane 34 of an image sensing element (CCD) of the virtual camera 33 set at the position P ($x'_0$, $z'_0$), and an image 35 at the observation position P ($x'_0$, $z'_0$) formed on the virtual image sensing plane 34, i.e., at the viewpoint position.

Note that the image sensing plane 34 of the virtual camera 33 is imaginarily illustrated on the object side with respect to the observation position for the sake of easy understanding since the screen upon observing the object 31 at the observation position P is assumed. However, in practice, if the observation position P is assumed to be the center of the camera, the image sensing plane is present on the side opposite to the object with respect to the observation position P.

FIG. 3 also illustrates an image 36 at a z-observation position on the actual line 32 with projection viewpoints, i.e., a viewpoint position R, and an image 37 at a viewpoint position Q on the line 32 with projection viewpoints.

Figure 4:
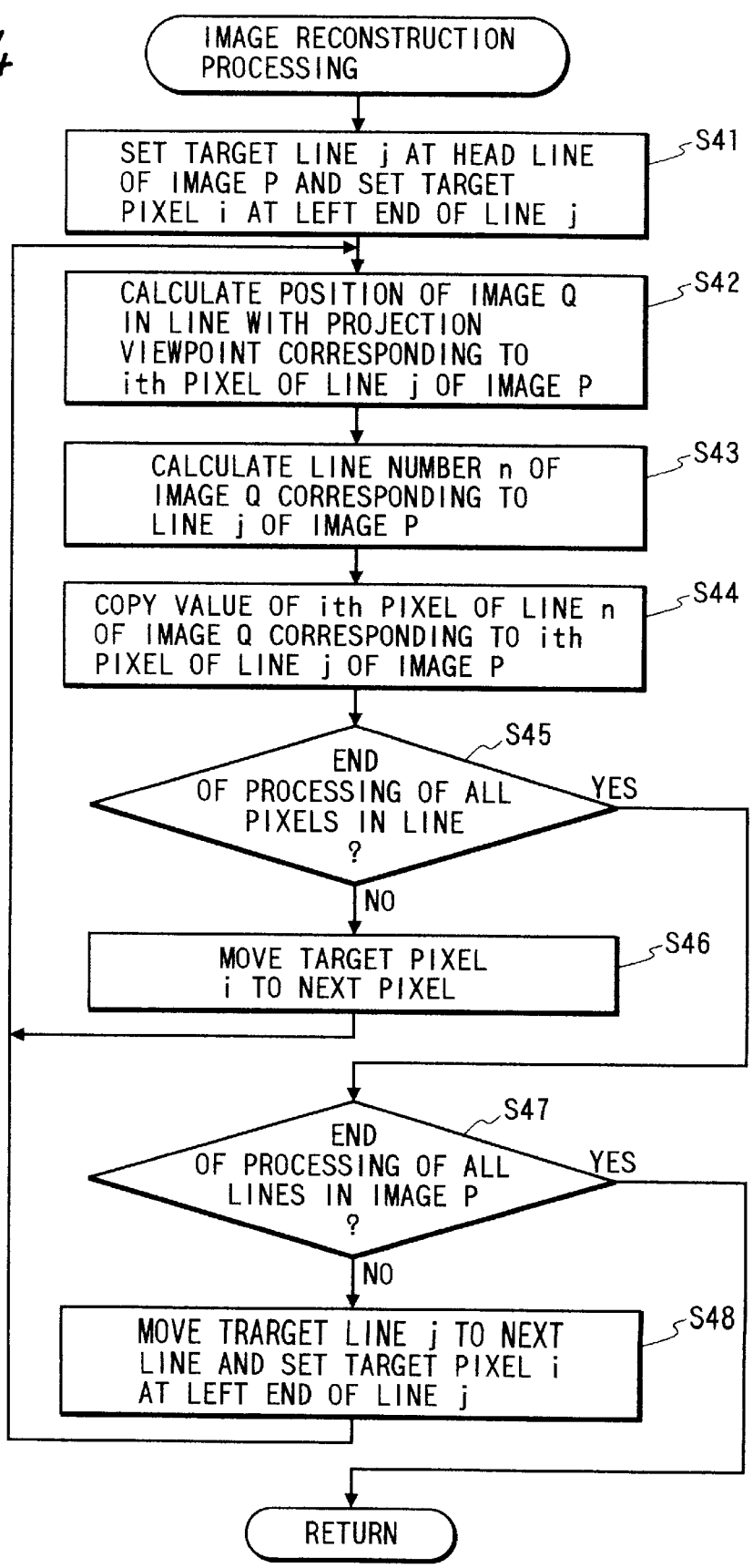
FIG. 4 is a flow chart showing the flow of the image reconstruction processing of the image processing apparatus of the first embodiment.

The image reconstruction processing in step S25 in the flow chart in FIG. 2 will be described below with reference to FIG. 3 above and the flow chart in FIG. 4. In the following description, i represents the pixel, in the horizontal direction, on the screen, and j represents the line in the vertical direction. In step S41, a target line j is set at the head line of an image P, and a target pixel i is set at the pixel at the left end of the line j.

In step S42, the position of an image Q in the line 32 with projection viewpoints corresponding to the i-th pixel of the line j of an image P is calculated. This position can be calculated as follows. Assume that a certain point A is imaged at a pixel position Pi of the virtual camera at the viewpoint position P. Also, assume that Q represents the intersection between a line connecting the positions A and P, and the line 32 with projection viewpoints.

At this time, as can be seen from FIG. 3, the object imaged at the pixel position Pi is equivalent to that imaged at a pixel position Qi of the image taken at the viewpoint position Q.

From the geometric limit condition in FIG. 3, the X-coordinate x of the viewpoint position Q can be expressed by equation (1) below. In this case, the central pixel position of the scan line is assumed to be the 0th pixel.

$$x = x'_0 + i \cdot d \cdot (g - z'_0)/f \quad (1)$$

where d is the pixel pitch of the virtual image sensing plate 34 of the virtual camera 33, f is the focal length, and g is the distance from the origin to the line 32 with projection viewpoints.

Similarly, the object imaged at a pixel position Pj of the virtual camera at the viewpoint position P is equivalent to that imaged at a pixel position Rj of an image at a viewpoint position R stored in the memory unit 14.

With this method, an image at an arbitrary viewpoint position can be reconstructed from images taken at other viewpoint positions. However, the following problem must be solved.

More specifically, with this method, for example, when an image is reconstructed by copying the i-th pixel value of the line j of the image Q to the i-th pixel of the line j of the image P, the reconstructed image is often distorted, i.e., the object in the image vertically stretches or shrinks. In order to solve this problem, in step S43, the line number of the image Q corresponding to the line j of the image P is calculated. The method of calculating the line number of the image Q will be described below with reference to FIG. 5.

Figure 5:
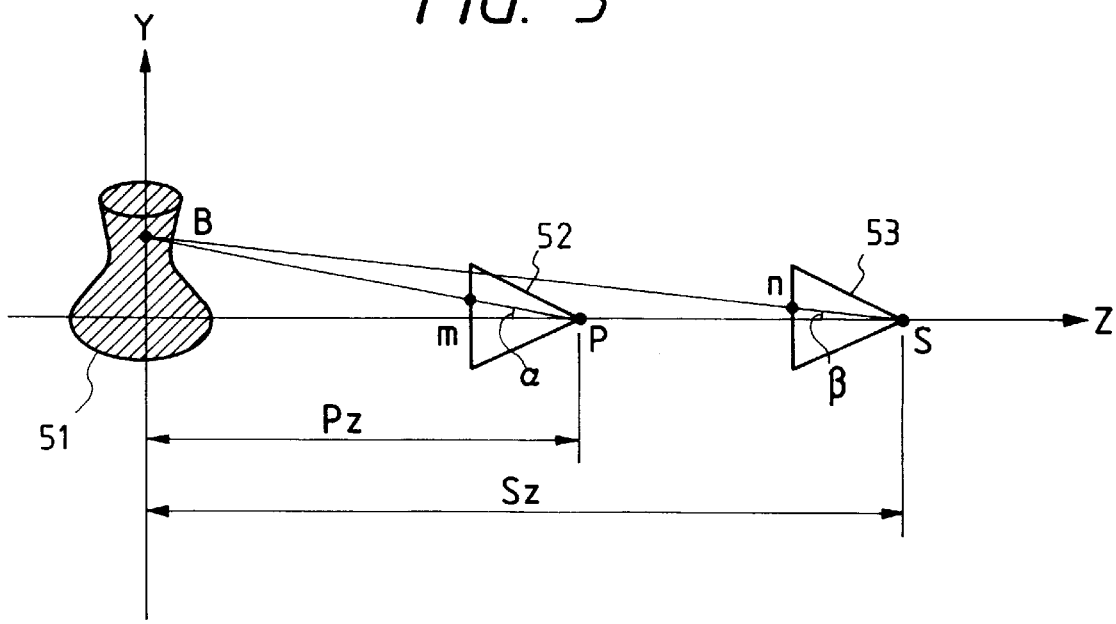
FIG. 5 is a view showing the principle of distortion correction of an image reconstructed by the image reconstruction processing of the image processing apparatus of the first embodiment.

FIG. 5 shows the principle of correcting distortion of the image reconstructed by the processing in step S25 in the image processing apparatus of the first embodiment. FIG. 5 illustrates an object 51, an image 52 to be reconstructed at an arbitrary viewpoint position P, and an image 53 at a viewpoint position S on the line 32 with projection viewpoints.

A given point B in the object 51 will be examined. Assume that the point B is close to the Y-axis, the Z-coordinate values Pz and Sz of the image 52 to be reconstructed at the viewpoint position P and the image 53 at the viewpoint position S on the line 32 with projection viewpoints are sufficiently large, or the Z-coordinate value Pz of the image 52 to be reconstructed at the viewpoint position P is nearly equal to the Z-coordinate value Sz of the image 53 at the viewpoint position S on the line 32 with projection viewpoints. In this case, light rays coming from the point B are recorded on the m-th line in the image 52 to be reconstructed at the viewpoint position P, and the n-th line in the image 53 at the viewpoint position S on the line 32 with projection viewpoints. If d represents the pixel pitches of the virtual image sensing plate 34, f represents the focal length of the virtual camera 33, and N represents the number of lines of the virtual image sensing plane 34, we have:

$$Pz \cdot \tan \alpha = Sz \cdot \tan \beta \quad (2)$$

$$\tan \alpha = d \cdot (N/2 - m)/f \quad (3)$$

$$\tan \beta = d \cdot (N/2 - n)/f \quad (4)$$

From equations (2), (3), and (4):

$$n = N/2 + (m - N/2) \cdot Sz/Pz \quad (5)$$

Accordingly, the value of the m-th scan line of the image 52 to be reconstructed at the viewpoint position P is equivalent to that of the n-th scan line, given by equation (5), of the image 53 at the viewpoint position S on the line 32 with projection viewpoints. Thus, in step S44, the value of the i-th pixel of the line n of the image Q is copied to the i-th pixel of the line j of the image P. With this processing, image distortion upon reconstructing the image at the viewpoint position, which is not on the line 32 with projection viewpoints can be suppressed to some extent. Thereafter, the flow advances to step S45 to check if processing for all the pixels in the target line j is complete. If YES in step S45, the flow advances to step S47; otherwise, the flow advances to step S46. In step S46, the target pixel i is moved to the right neighboring pixel, and the flow returns to step S42. In step S47, it is checked if the processing for all the lines in the image P is complete. If YES in step S47, this subroutine ends and returns to step S26 in the flow chart in FIG. 2; otherwise, the target line j is moved to the next line and the target pixel i is set at the left end of the line j in step S48. Thereafter, the flow returns to step S42.

In this manner, if multi-viewpoint images taken at very small intervals on the line 32 with projection viewpoints are obtained, the same processing based on the above-mentioned principle is repeated for all the scan lines, thereby reconstructing an image at the viewpoint position which is not on the line 32 with projection viewpoints, while minimizing image distortion.

(b) Second Embodiment:

The first embodiment has a limitation that the viewpoint positions of input multi-viewpoint images must be arranged in line. A method that can remove this limitation will be explained below.

Figure 6A:
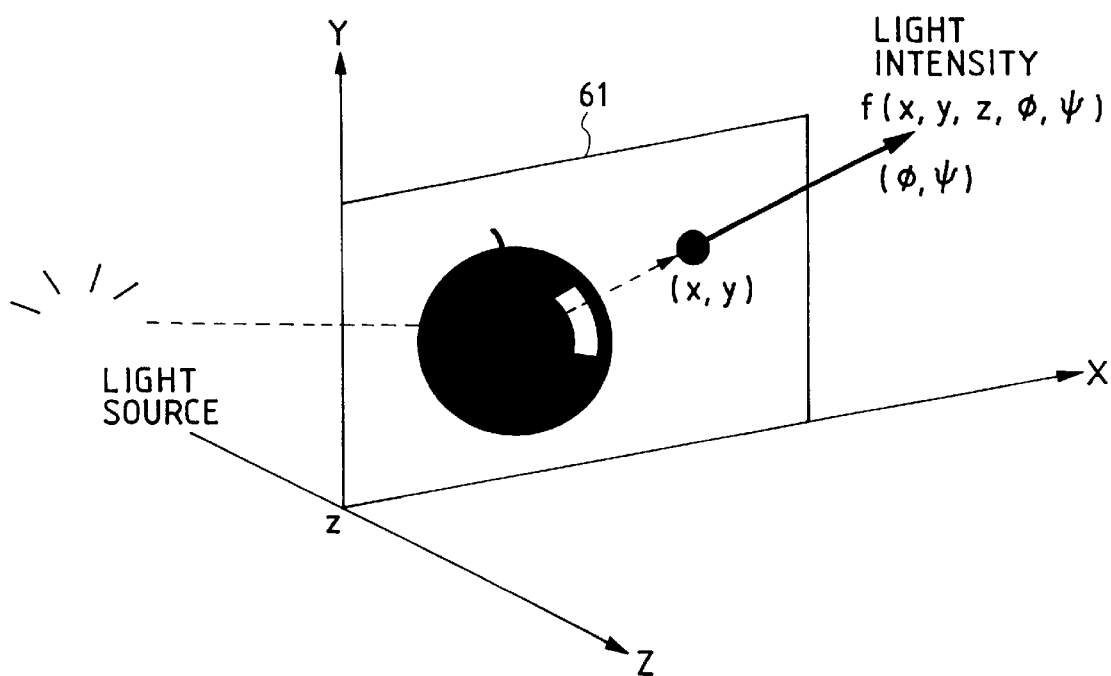
FIGS. 6A and 6B are explanatory views of the reference plane of an image processing apparatus according to the second embodiment of the present invention.
Figure 6B:
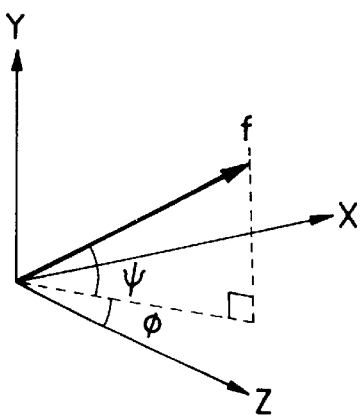

A technique (three-dimensional space expression by light space) for assuming a plane of z=0 (to be referred to as a reference plane 61 hereinafter) on a coordinate system as shown in FIGS. 6A and 6B, and expressing a three-dimensional space as a set of light rays that pass through this plane has been proposed.

Figure 7:
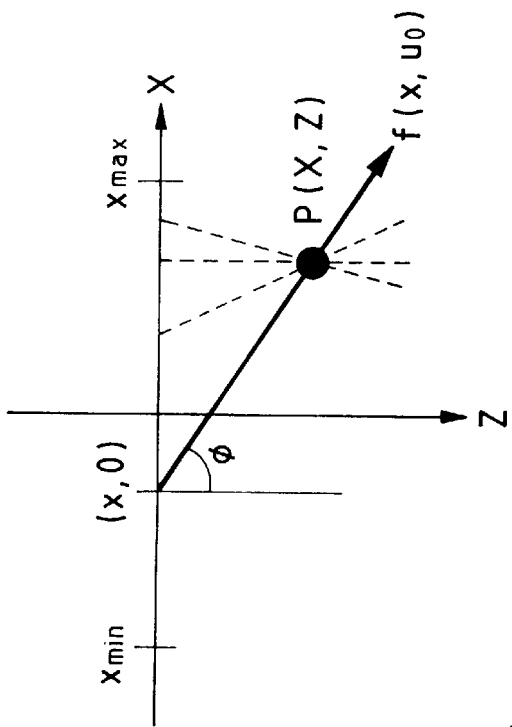
FIG. 7 is an explanatory view of light rays that pass a point P.

In this technique, an image that can be viewed from a viewpoint position P falling within a range $z \geq 0$ in the three-dimensional space is equivalent to an image obtained by sampling only light rays that pass P from the set of light rays that pass through the reference plane 61 (see FIG. 7).

Figure 8:
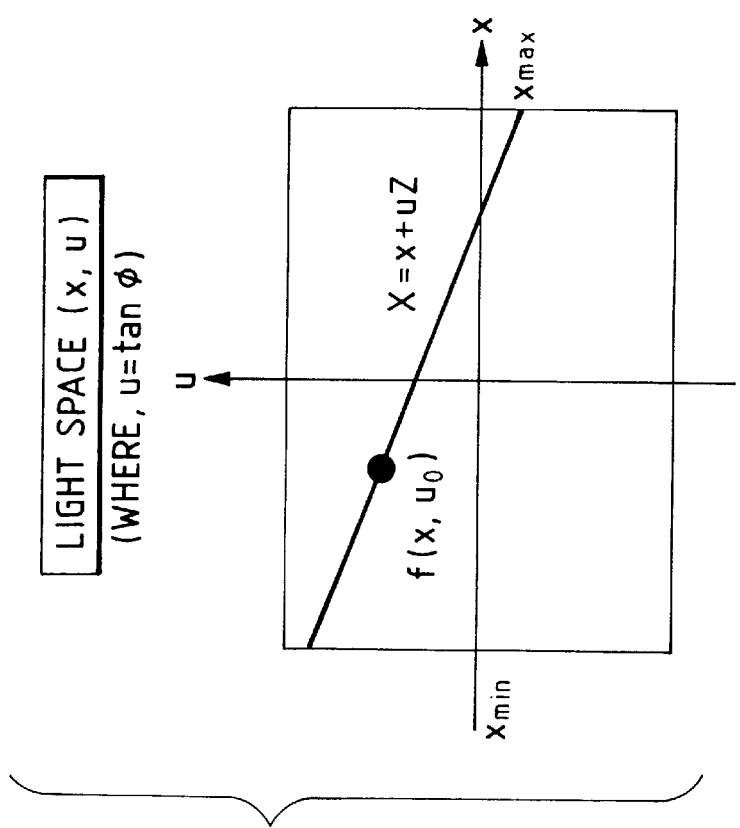
FIG. 8 is an explanatory view of the x-u plane of the image processing apparatus of the second embodiment.

In general, each light ray is expressed by a position (x, y) where it passes through the reference plane 61, angles $\phi$ and $\psi$ the light ray makes with the X- and Y-axes, time t at which the light ray passes through the plane, and a color (r, g, b) of the light ray. However, in practice, the object is assumed to be a still object and to have no parallax in the Y-axis direction since the computation volume and data volume become huge if all these data are used. Under this assumption, light rays are projected onto the light space (an x-u plane in this case) using u=tan $\phi$, and when the light space is to be processed in the projected x-u space, light rays that pass a given point P define a linear path, as shown in FIG. 8. This path is given by:

$$x = X - Z \cdot u \quad (6)$$

$$u = \tan \phi \quad (7)$$

where (X, Z) represents the observation viewpoint position, and x represents the position of the intersection between each light ray and the X-axis on the x-u plane. Also, $\phi$ represents the angle the light ray makes with the Z-axis.

Figure 9B:
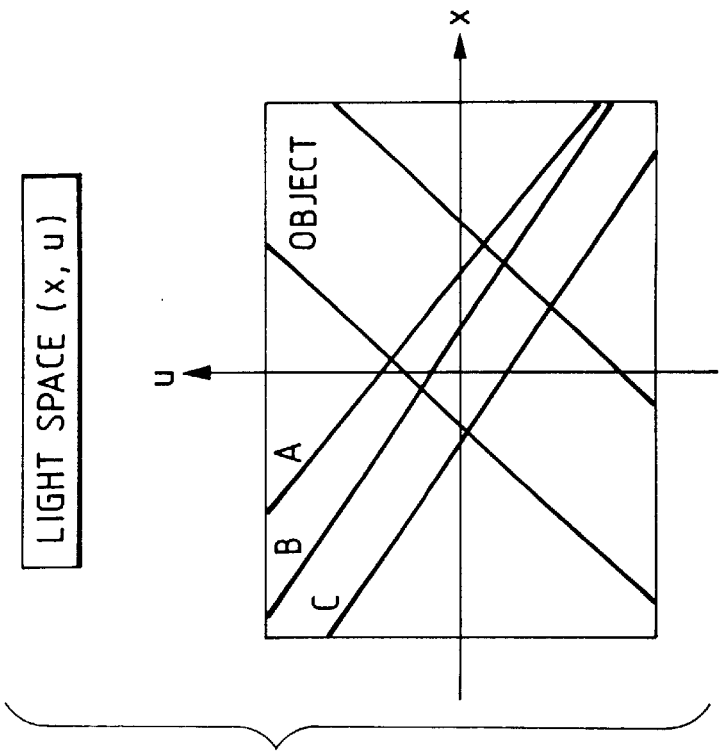
FIGS. 9A and 9B are explanatory views of the relationship of the object and the projection viewpoint position in the image processing apparatus of the second embodiment.
Figure 9A:
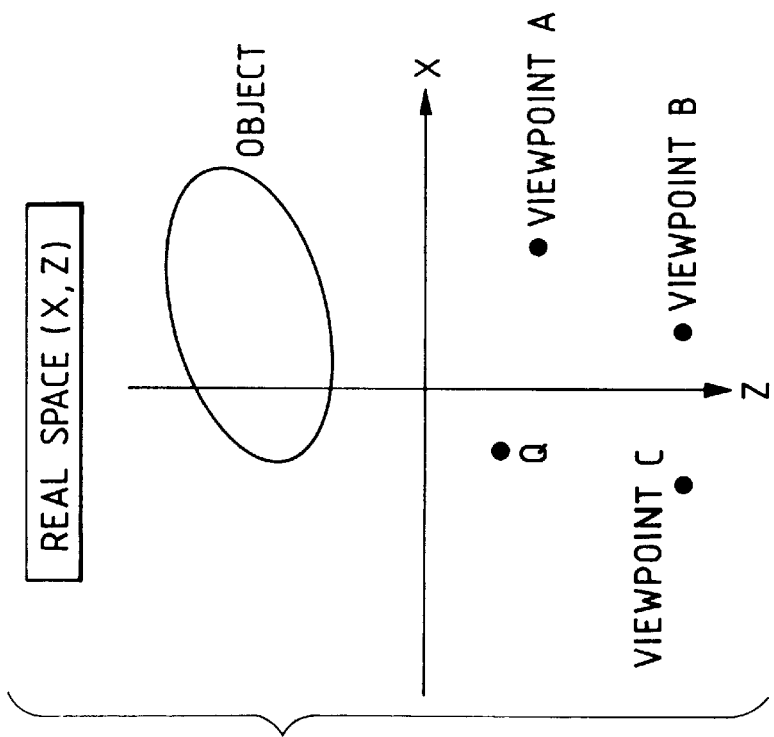
Figure 10:
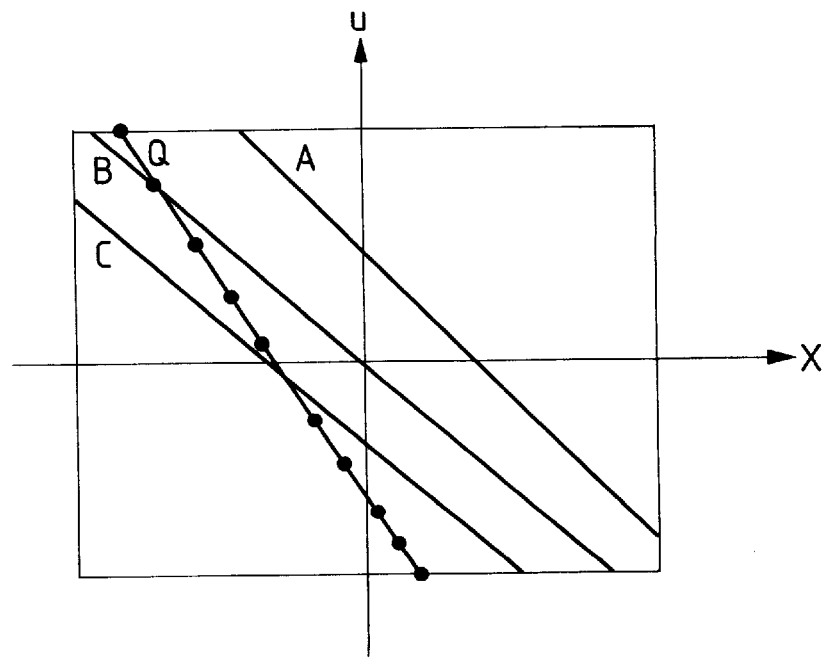
FIG. 10 is an explanatory view of the paths of light rays that pass the projection viewpoint position and the paths of light rays that pass a point Q in the image processing apparatus of the second embodiment.

First, as shown in FIGS. 9A and 9B, a linear path is calculated based on images obtained at a large number of viewpoint positions, and it is assumed that the x-u plane is filled with these paths at high density. At this time, an image at a viewpoint position Q falling within the range $z \geq 0$ can be obtained by calculating the paths of light rays that pass the position Q on the x-u plane and acquiring the colors of light rays already recorded on the paths, as shown in FIG. 10. In this method, since processing is attained by mapping multi-viewpoint images on the x-u plane, an image can be reconstructed even when the viewpoint positions of input images are not arranged in line.

(c) Third Embodiment:

In the second embodiment, processing is performed in units of scan lines as in the first embodiment. That is, the first line of an image at a given viewpoint position to be generated is generated using the first lines of input multi-viewpoint images, and the j-th line of the image at the viewpoint position to be generated is generated using the j-th lines of input multi-viewpoint images. When an image is generated in this manner, it is distorted since there is no parallax in the vertical direction (Y-direction).

In order to eliminate this distortion, in the third embodiment, upon acquiring the color data of light rays already recorded on the above-mentioned paths, the correspondences between points on the paths and the input multi-viewpoint images are checked. From the distance Sz from the phototaking position of the image to the reference plane and the distance Pz from the position of the image to be generated to the reference plate, a corresponding line is calculated in accordance with equation (5) above, and the image is generated using the calculated line. Note that N represents the number of lines of the image, m represents the position of the target line, and n represents the line position in the corresponding image. If n assumes a value which is nonexistent, the value of the image to be generated is set to be a predetermined value.

As described above, upon processing each line, the line position in a required multi-viewpoint image is calculated in correspondence with the position of the image to be generated and the position of a multi-viewpoint image that includes light rays required for generating the image, and the calculated line is used, thus suppressing distortion of the generated image.

As described above, according to the first, second, and third embodiments, since the viewpoint position of the observer is detected and an image observed from the observer is reconstructed using a plurality of images, when the viewpoint position of the observer moves, an image corresponding to the moved viewpoint position can be smoothly output.

Upon generating an image, the position of a scan line required for generating the image is calculated on the basis of the viewpoint position of the observer and the viewpoint position of an input image required for generating the image, and is used in generating the image. In this manner, a distortion-free image can be generated.

A stereoscopic image can be reconstructed using images corresponding to the right and left viewpoints using a plurality of pieces of image information taken at multiple viewpoints, and an image processing apparatus with a broad application range can be realized.

An image observed from an arbitrary viewpoint position is generated from a plurality of pieces of image information taken at multiple viewpoint positions, and distortion caused upon generating an image can be eliminated, thus obtaining a natural image.

An image with a view from an arbitrary viewpoint position can be easily generated from a plurality of pieces of image information taken at multiple viewpoint positions, and various kinds of image processing can be performed without increasing the calculation scale and required memory capacity.

Since image synthesis free from any distortion can be realized, a natural image with high quality can be obtained.

When the observer watches an arbitrary position in the display screen of the monitor, an image at that viewpoint position can be easily generated.

(d) Fourth Embodiment:

Since the second embodiment uses a single plane set at z=0 as the reference plane, the viewpoint position range that allows observation is limited to the range $z \geq 0$ and, hence, the observation range within which movement of the viewpoint position is allowed is narrow. When the three-dimensional space is expressed by a single x-u space, if $\phi$ is nearly equal to $\pm 90°$ (or if the reference plane and light rays that pass through the reference plane are nearly parallel to each other), tan $\phi$ diverges, and an infinitely broad x-u space, i.e., a huge data volume, is required.

In the fourth embodiment, a broad observation range within which movement of the viewpoint position is allowed can be assured as compared to the second embodiment, and yet an increase in required data volume can be suppressed.

Figure 11:
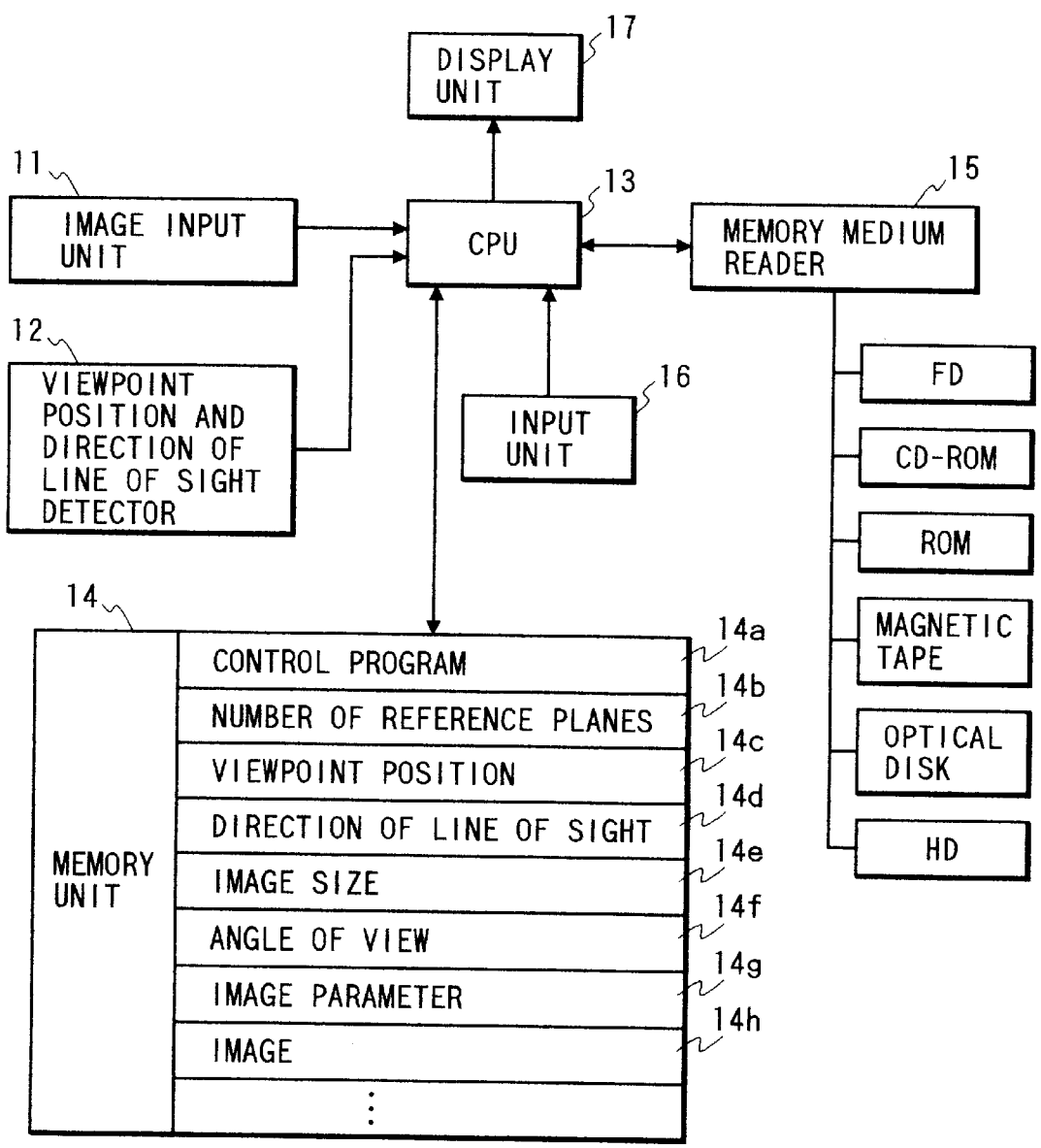
FIG. 11 is a block diagram showing the arrangement of an image processing apparatus according to the fourth embodiment of the present invention.

FIG. 11 is a block diagram showing the image processing apparatus according to the fourth embodiment of the present invention.

The apparatus shown in FIG. 11 has basically the same arrangement as the image processing apparatus shown in FIG. 1. However, in FIG. 11, a memory unit 14 stores the number 14b of reference planes, a viewpoint position 14c, a direction 14d of line of sight, an image size 14e, an angle 14f of view, an image parameter 14g, an image 14h, and the like in addition to a program 14a for controlling a CPU 13.

Figure 12:
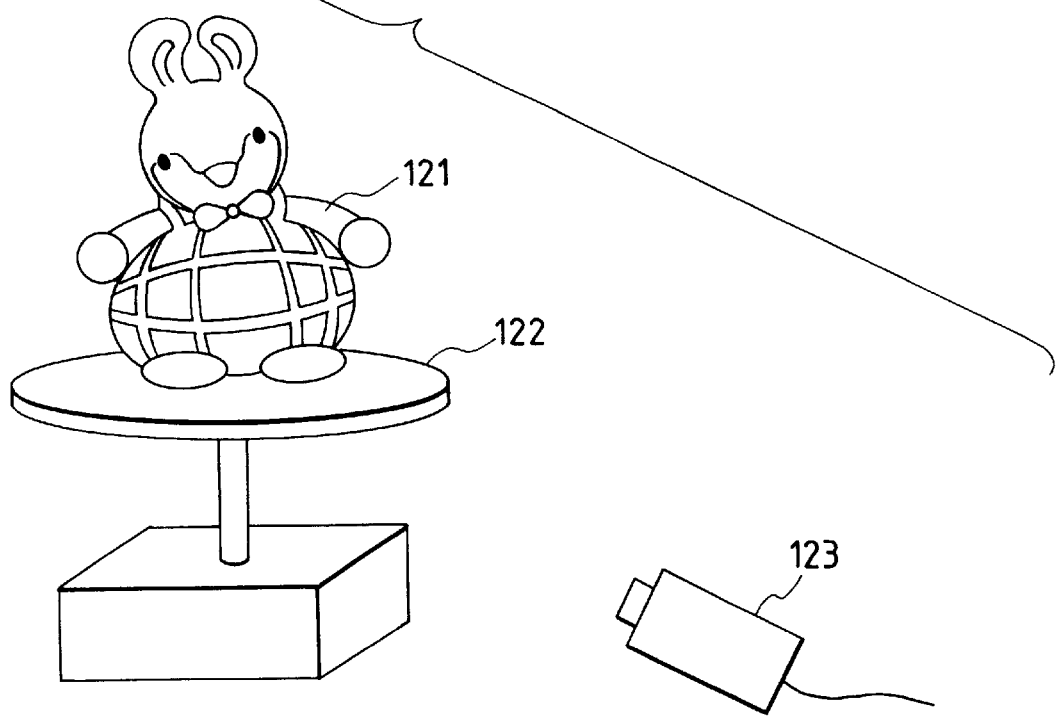
FIG. 12 is an explanatory view of the method of acquiring multi-viewpoint images in an image input unit of the image processing apparatus of the fourth embodiment.

FIG. 12 is an explanatory view of the method of acquiring multi-viewpoint images in an image input unit 11 of the image processing apparatus of the fourth embodiment. FIG. 12 illustrates an object 121 to be phototaken, a rotary table 122 which rotates while placing the object 121 thereon, so as to take images of the object 121 from its surrounding positions, and a CCD camera 123 used for taking images of the object 121.

Multi-viewpoint images are taken by the CCD camera 123 while rotating the object 121 placed on the rotary table 122. The multi-viewpoint images taken by the CCD camera 123 are stored in the memory unit 14.

The operation of the fourth embodiment will be explained below. For the sake of simplicity, only a case will be described below wherein the parallax in the Y-axis direction is ignored. However, even when the parallax in the Y-axis direction is present, this embodiment can be similarly applied, needless to say. The operation will be briefly described below with reference to FIG. 13.

Figure 13:
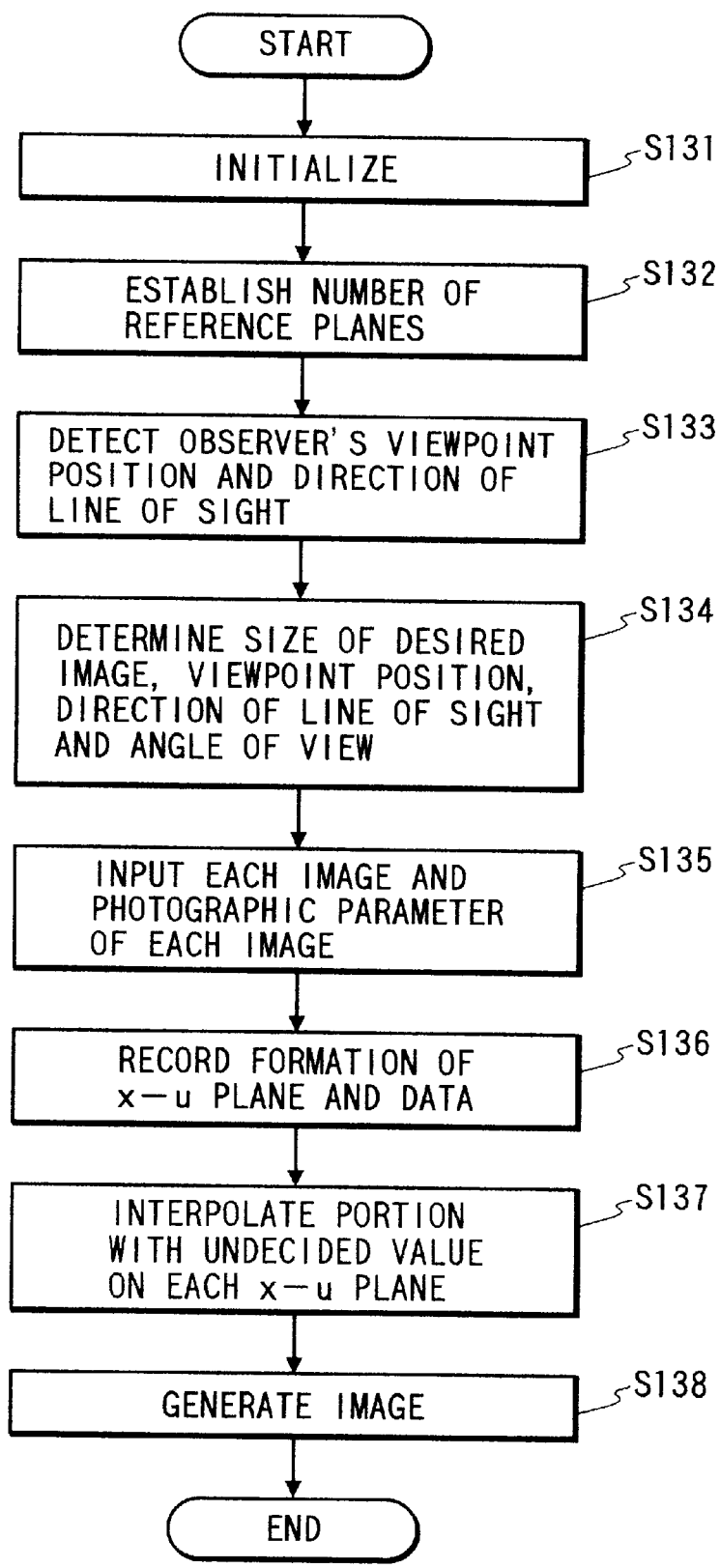
FIG. 13 is a flow chart showing the flow of the processing of the image processing apparatus of the fourth embodiment.

FIG. 13 is a flow chart showing the flow of the processing of the image processing apparatus of the fourth embodiment.

Prior to the processing, the work area, variables to be used, and the like in the memory unit 14 are initialized in step S131.

In step S132, the number of reference planes of the light space and their layout are determined. In this case, predetermined values may be used or an operator may input these values from an input unit 16 at the beginning of the processing. When the observable region is limited, the number of reference planes may be set in correspondence with the limited region. The present invention is not limited to the above-mentioned method.

In this case, four reference planes are arranged, so that their u-axes overlap each other, and the four planes are shifted 90° each in succession to have their u-axes as the center. This layout will be referred to as a water-wheel layout hereinafter, and FIGS. 14A and 14B show this state. In this embodiment, four reference planes are used. However, the present invention is not limited to this, and the number n of reference planes can be any integer that satisfies $n \geq 1$.

A case will be explained below wherein the radially arranged reference planes are used to express the light space of the image processing apparatus of the fourth embodiment.

Arranging the reference planes radially is to arrange the reference planes, so that all the reference planes cross on a single line (the Y-axis in this case) which passes through an object, the angles adjacent reference planes make equal each other, and one of the reference plane makes an angle $\alpha/2$ (where $\alpha$ is the angle adjacent reference planes make) with the Z-axis. Then, the angles the reference planes arranged in this manner make with light rays which pass through the reference planes are checked, and light rays are recorded in a light space corresponding to the reference plane that makes an angle closest to right angles. In the following description, a case will be exemplified wherein four radially arranged reference planes are used. In FIG. 14B, a first reference plane 141 corresponds to a light space which records the paths of light rays which come from the object 121 and have angles falling within the range $0° \leq \phi < 90°$. A second reference plane 142 corresponds to a light space which records the paths of light rays which come from the object 121 and have angles falling within the range $90° \leq \phi < 180°$. A third reference plane 143 corresponds to a light space which records the paths of light rays which come from the object 121 and have angles falling within the range $180° \leq \phi < 270°$. A fourth reference plane 144 corresponds to a light space which records the paths of light rays which come from the object 121 and have angles falling within the range $270° \leq \phi < 360°$.

After the processing in step S132, the viewpoint position and direction of line of sight are detected by the viewpoint position and direction of line of sight detector 12 in step S133. In this case, since an image pointed by the viewpoint position and direction of line of sight of the observer is considered as a desired image, the viewpoint position and direction of line of sight detector 12 is used. However, the present invention is not limited to this specific means, and another means for inputting a desired image (the viewpoint position and direction of line of sight) of the operator may be used.

Thereafter, in step S134, the size and angle of view of the image to be generated are determined. These values may be input by the operator using the input unit 16 or values pre-stored in the memory unit 14 may be used. Alternatively, these values may be determined in correspondence with the resolution of the display unit 17 or the processing performance of the CPU 13, and the present invention is not limited to the above specific means.

After the image size and angle of view are determined, the flow advances to step S135, and multi-viewpoint data stored in the memory unit 14 and parameters (the direction $\alpha$ of the optical axis, the angle $\omega$ of view, the number N of pixels, in the scan line direction, of the CCD, the number M of lines, and the phototaking position (x, z)) upon taking images are extracted. Based on the extracted parameters, the direction $\phi$ of light rays that pass the lens center of the camera and the individual pixels of the CCD are calculated, and one of the four reference planes in which the corresponding light ray is to be recorded is determined based on the values $\phi$. According to equations (6) and (7), the colors of light rays, the numbers of original multi-viewpoint images corresponding to the light rays, and the pixel numbers are recorded in the x-u space corresponding to the determined reference plane.

Figure 15:
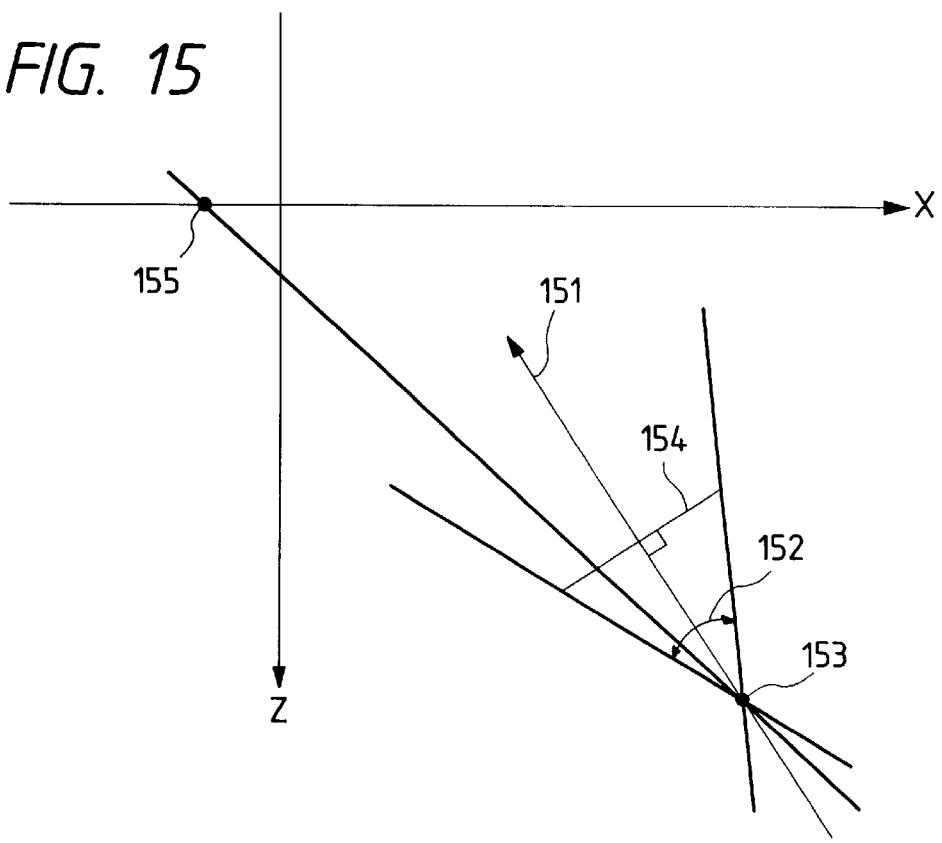
FIG. 15 is an explanatory view of generation of light space data in the image processing apparatus of the fourth embodiment.

Generation of light space data in the image processing apparatus of the fourth embodiment will be described below with reference to FIG. 15. FIG. 15 illustrates an optical axis 151 of a camera, an angle 152 of view of the camera, a lens center 153 of the camera, a CCD surface 154 of the camera, and an intersection 155 between a line connecting the i-th pixel on the CCD surface 154 and the lens center 153, and the X-axis.

The operation in step S136 after step S135 will be described in detail below with reference to FIG. 15.

As shown in FIG. 15, assume that (x, z) is the position of the lens center 153 of the camera, $\alpha$ is the direction of the optical axis 151 of the camera, $\omega$ is the angle 152 of view of the camera, and N is the number of pixels on the CCD surface 154 of the camera, as the phototaking conditions of a given one among multi-viewpoint images. Also, numbers are assigned to the individual pixels on the CCD surface 154 of the camera, as shown in FIG. 15.

First, a reference plane from which a light ray, that connects the i-th pixel ($-N/2 \leq i < N/2$) on the first line of the CCD surface 154 of the camera and the lens center 153 of the camera, comes is determined. The reference plane is determined based on the angle the light ray makes with the Z-axis, and this angle φ is given by:

$$\phi = a\tan(i * \tan(\omega/2.0)/N/2) = \alpha \quad (8)$$

where a tan represents arc tangent. At this time, if the angle (direction) φ of the light ray falls within the range $0° \leq \phi < 90°$, it is determined that the light ray comes from the first reference plane 141; if the angle φ falls within the range $90° \leq \phi < 180°$, the second reference plane 142; if the angle φ falls within the range $180° \leq < 270°$, the third reference plane 143; and if the angle φ falls within the range $270° \leq \phi < 360°$, the fourth reference plane 144. The color of this light ray is recorded at a position given by equations (6) and (7) on the x-u space corresponding to the determined reference plane. Note that equations (6) and (7) are those using z=0 as the reference plane and, hence, the following pre-processing is performed.

If it is determined that the light ray comes from the third reference plane 143, the position of the lens center 153 of the camera is rotated 225°, and 225° are subtracted from the direction φ of the light ray. With this processing, the third plane 143 becomes a plane of z=0, and equations (6) and (7) can be applied. Likewise, the first, second, and fourth planes 141, 142, and 144 are subjected to the same processing (the angles to be rotated and subtracted are respectively 45°, 135°, and 315°), and equations (6) and (7) can be applied. (In general, the angles to be rotated and subtracted are calculated by $(c1+c2)/2$ if $c1 \leq \phi < c2$.)

The above-mentioned processing is performed for light rays that pass all the pixels falling within the range $-N/2 \leq i < N/2$, and the image number of the corresponding multi-viewpoint image and the pixel position (pixel number) in the first line of the image are recorded in the corresponding x-u space. Furthermore, such processing is repeated for all the input multi-viewpoint images. With this processing, all the light rays calculated from the input multi-viewpoint images can be recorded in the four x-u spaces. In this embodiment, the processing is performed for only the first line of each multi-viewpoint image, and is not performed for the remaining lines. When vertical parallax (in the Y-direction) is to be ignored, if the first line alone is processed, the remaining lines can be mapped at the same position in the same x-u space. For this reason, after the processing is performed for the first line in each image, other lines can be similarly calculated.

Thereafter, in step S137, a portion with an undecided value on each x-u space is calculated by interpolation. This processing may be attained by a method of detecting the nearest neighboring value or a method of detecting corresponding points on the x-u space to obtain the path of the corresponding points, and performing interpolation based on the obtained path. Also, other interpolation methods may be used.

In step S138, an image is generated in accordance with the viewpoint position and direction of line of sight of the observer, thus ending a series of processing operations.

Image generation in step S138 will be described in more detail below.

If (x, z) represents the viewpoint position of the observer, α represents the direction of line of sight, and ω represents the angle of view, an image that can be observed by the observer is equivalent to an image taken by a virtual camera with the lens center position (x, z), the direction α of the optical axis, and the angle ω of view. Thus, an image taken by this virtual camera is assumed, and the mapping positions, in the x-u space, of light rays obtained from this image are calculated in accordance with the above-mentioned method. The calculation formulas used in the calculations are the same as equations (6) and (7). With these calculations, since the image number and pixel number recorded at the corresponding position on the x-u space can be detected, the line number is calculated subsequently. This processing will be described below with reference to FIGS. 5 and 15.

In FIG. 5, the fourth embodiment is substantially the same as the first embodiment, except that the viewpoint position S is not on the line 32 with projection viewpoints but is present in multi-viewpoint images obtained from the image input unit 11.

Hence, if d represents the pixel pitch of the CCD surface 154 of the camera, f represents the focal length of the CCD camera 153, and N represents the number of lines of the CCD surface 154 of the camera, equations (2), (3), and (4) above are obtained, and from equations (2), (3), and (4), equation (5) above is obtained.

Accordingly, the value of the m-th scan line of the image 52 to be reconstructed at the viewpoint position P is equivalent to that of the n-th scan line, given by equation (5), of the image 53 at the viewpoint position S in the multi-viewpoint images obtained from the image input unit 11.

After the line number is obtained, the pixel in the input images can be uniquely determined. Hence, the color of the determined pixel is assigned to that of the virtual camera image corresponding to the above-mentioned light ray. If no uniquely determined pixel is present, the closest light ray of those recorded on the x-u space may be used instead or a predetermined value may be assigned.

When the above-mentioned processing is performed for all the pixels of the virtual camera image, an image corresponding to the viewpoint position and direction of line of sight of the observer can be generated.

With the above arrangement, a region which cannot be expressed by a single reference plane can be expressed. Since a plurality of reference planes are used, an angle each reference plane makes with a light ray that passes through the plane becomes close to right angles. For this reason, the area of the x-u space corresponding to each reference plane can be small, and consequently, the data volume to be held can be reduced.

Note that the viewpoint position and direction of line of sight detector 12 may comprise any means as long as it can detect the viewpoint position and direction of line of sight. Also, the display unit 17 may use a stereoscopic display unit which allows binocular stereoscopic viewing of, e.g., the lenticular method, a spectacle method, or the like, and images corresponding to the right and left eye positions of the observer are generated in step S138, thus coping with the movement of the viewpoint position of the observer.

(e) Fifth Embodiment:

A case will be described below wherein the layout of the reference planes in the fourth embodiment is changed.

Figure 16:
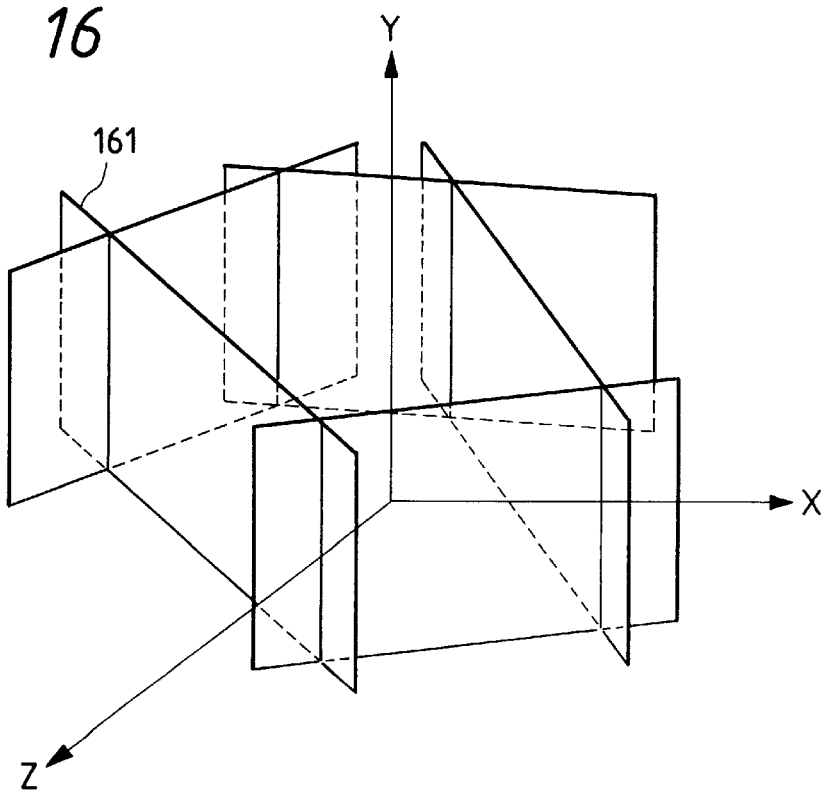
FIG. 16 is a perspective view showing a plurality of reference planes, which are arranged to cover the object of an image processing apparatus according to the fifth embodiment of the present invention.
Figure 17:
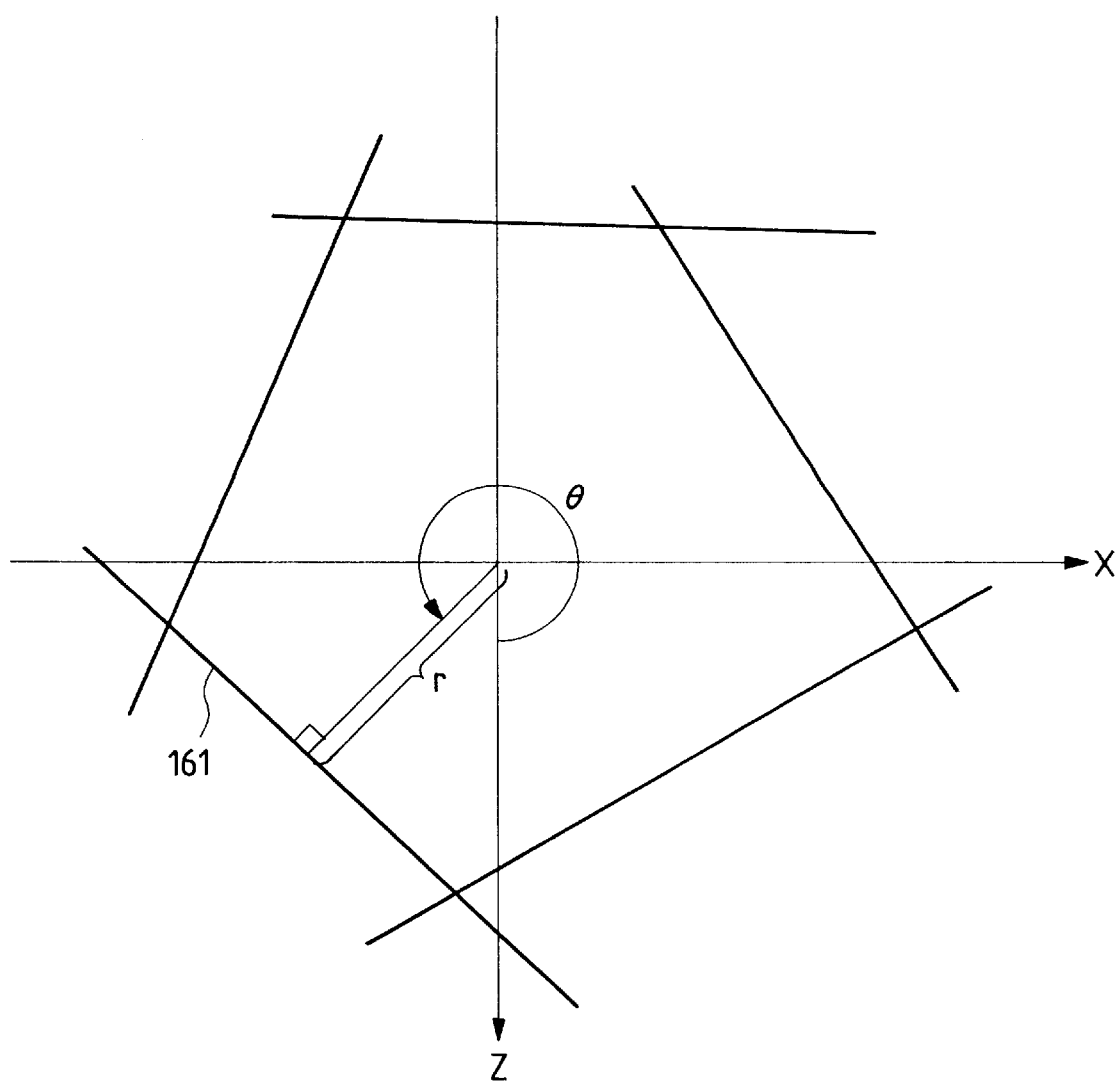
FIG. 17 is a top view of the image processing apparatus of the fifth embodiment.

FIG. 16 shows a plurality of reference planes, which are arranged to cover an object in an image processing apparatus according to the fifth embodiment. In FIG. 16, a reference plane 161 is one of those arranged to surround the object. FIG. 17 is a top view of FIG. 16.

As shown in FIG. 17, assume that θ represents the angle the perpendicular dropped from the Y-axis to the reference plane a 161 makes with the Z-axis, and r represents the distance between the reference plane a 161 and the Y-axis.

As in the fourth embodiment, the reference plane and the direction of the light ray to be recorded are determined.

Assume that light rays which have an angle $\xi$ (similarly measured as $\theta$ in FIG. 17) the light ray makes with the Z-axis falling within the range $h1 \leq \xi < h2$ are to be recorded on the reference plane 161. In the fourth embodiment, equations (6) and (7) are made usable by bringing the reference plane to the position z=0 by rotating the reference plane, camera position, and direction of the light ray. In this case as well, the reference plane is brought to the position z=0 by rotating the reference plane, camera position, and direction of the light ray $-\theta$ and translating them $-r$, so as to use equations (6) and (7). By performing this processing for all the reference planes that surround the object, an image at an arbitrary viewpoint position can be generated by performing the processing by the same method as in the fourth embodiment.

Note that the distance between the Y-axis and the camera after rotation and translation is used as the distance from the Y-axis to the camera used upon calculating the line number.

(f) Sixth Embodiment:

In the fourth embodiment, when there is no light ray recorded at the position on the x-u space given by equations (6) and (7), the closest light ray recorded on the plane is used. If such light ray is calculated in advance by interpolation processing, an image with higher precision can be generated. The interpolation processing method will be explained below.

On the x-u space, a point in a real space defines a linear path as in step S137. By utilizing this nature, a line is drawn on the x-u space, and the colors of light rays present on this line are checked. If these light rays have similar colors, the line can be considered as the path of one point in the real space, and the average value of these colors is assigned to a position, where no light ray is present, on the line. This processing is performed while assuming all lines until the entire region on the x-u space are assigned with values (colors).

With this interpolation processing, the quality of an image generated can be improved as compared to a case wherein the color of a neighboring light ray is used.

(g) Seventh Embodiment:

In the first and fourth embodiments, images taken at a plurality of viewpoint positions are input from the image input unit 11. However, the present invention is not limited to this. For example, images may be input from a memory medium such as a database, CD-ROM, or the like to the memory unit 14 via the memory medium reader 15.

As described above, in the fourth, fifth, sixth, and seventh embodiments, since multi-viewpoint images are converted into light space data corresponding to a plurality of reference planes, a region which cannot be expressed by a single reference plane can be expressed. Since a plurality of reference planes are used, the angle each reference plane makes with a light ray that passes through the plane becomes close to right angles. For this reason, the area of the x-u space corresponding to each reference plane can be small, and consequently, the data volume to be held can be reduced.

The present invention may be applied to either a system constituted by a plurality of devices or an apparatus consisting of a single device. The present invention may also be applied to a case wherein the invention is attained by supplying a program to the system or apparatus. In this case, a memory medium that stores the program according to the present invention achieves the present invention. By reading out the program from the memory medium to the system or apparatus, the system or apparatus operates in accordance with the predetermined method.

What is claimed is:

1. An image processing apparatus comprising:

image input means for inputting images of an object sensed at a plurality of viewpoint positions together with information indicating the plurality of viewpoint positions;

viewpoint position detection means for detecting a viewpoint position of an observer;

selection means for selecting an image from the images input by said image input means on the basis of the viewpoint position detected by said viewpoint position detection means, a position of said object and a virtual plane corresponding to the viewpoint position;

image generation means for generating an image on a virtual plane defined at the viewpoint position detected by said viewpoint position detection means by copying pixel data of the image selected by said selection means to pixel data of the image on the virtual plane in accordance with the relation of the viewpoint position and an image sensing position of the selected image; and image display means for displaying the image generated by said image generation means.

2. An apparatus according to claim 1, wherein said image generation means determines a scan line in the image selected by said selection means in accordance with the viewpoint position detected by said viewpoint position detection means and the viewpoint position upon taking the image selected by said selection means, and generates the image at the viewpoint position detected by said viewpoint position detection means on the basis of the determined scan line.

3. An apparatus according to claim 1, wherein said image generation means generates a stereoscopic image corresponding to the viewpoint position detected by said viewpoint position detection means, and said image display means stereoscopically displays the generated stereoscopic image.

4. An image processing method comprising the steps of:

inputting images of an object sensed at a plurality of viewpoint positions together with information indicating the plurality of viewpoint positions;

detecting a viewpoint position of an observer;

selecting an image from the images input in the image input step on the basis of the detected viewpoint position, a position of said object and a virtual plane corresponding to the viewpoint position;

generating an image on a virtual plane defined at the detected viewpoint position by copying pixel data of the image selected by said selecting step to pixel data of the image on the virtual plane in accordance with the relation of the viewpoint position and a photographing position of the selected image; and displaying the image generated in the image generation step.

5. A method according to claim 4, wherein the image generation step includes the step of determining a scan line in the image selected in the selection step in accordance with the viewpoint position detected in the viewpoint position detection step and the viewpoint position upon taking the image selected in the selection step, and generating the image at the viewpoint position detected in the viewpoint position detection step on the basis of the determined scan line.

6. A method according to claim 4, wherein the image generation step includes the step of generating a stereoscopic image corresponding to the viewpoint position detected in the viewpoint position detection step, and the image display step includes the step of stereoscopically displaying the generated stereoscopic image.

7. An image processing apparatus comprising:

image sensing means for sensing an image of an object;

memory means for storing a plurality of images at a plurality of image sensing positions sensed by said image sensing means in correspondence with the image sensing position information; and image generation means for generating an observation image upon observing the object at an arbitrary viewpoint position on the basis of the plurality of images, the corresponding image sensing position information stored in said memory means and a virtual plane corresponding to the arbitrary viewpoint position, wherein said image generation means selects, from the plurality of images stored in said memory means, an image which corresponds to a point at which a line, passing through an arbitrary point on the object and the arbitrary viewpoint position crosses the observation image, and generates the observation image defined at the arbitrary viewpoint position by copying on the virtual plane pixels of the selected image to pixels of the observation image.

8. An apparatus according to claim 7, wherein said image sensing means comprises cameras arranged at a plurality of positions.

9. An apparatus according to claim 7, wherein said image generation means comprises means for correcting distortion of the image on the virtual screen on the basis of a relative positional relationship between the virtual screen at the arbitrary viewpoint position and the extracted image.

10. An apparatus according to claim 7, further comprising display means for displaying the image on the virtual screen, and viewpoint position detection means which detects the arbitrary viewpoint position in a display screen of said display means.

11. An apparatus according to claim 7, wherein said image generation means generates a stereoscopic image by synthesizing images corresponding to right and left eye positions of an observer selected from the plurality of images stored in said memory means.

12. An image processing apparatus comprising:

multi-viewpoint image input means for inputting a plurality of images of an object having different viewpoint positions as multi-viewpoint image data;

image conversion means for analyzing the input multi-viewpoint image data into a plurality of rays of light corresponding to pixels of the image data;

recording means for recording pixel data corresponding to each of the rays directed on image planes defined to be around an object;

viewpoint input means for inputting a viewpoint position and a direction of line of sight of a user;

image generation means for selecting the image plane on the basis of a relation between an output of said viewpoint input means and a position of the object, copying the pixel data of the selected image plane, calculating a position to a pixel data on a required scan line and pixel position on the scan line in an arbitrary plane defined at the viewpoint position and generating a desired image on the arbitrary plane on the basis of the pixel data and the pixel positions.

13. An apparatus according to claim 12, wherein the image planes are arranged, so that the image planes cross each other on a first line passing through an object, angles adjacent planes make equal each other, and one of the image planes makes an angle half the angle adjacent image planes make with a second line which extends from the first line in a direction of an initial viewpoint position and perpendicularly crosses the first line.

14. An apparatus according to claim 13, wherein light rays corresponding to pixels passing through the image plane are rotated through a rotation angle upon rotating the image plane to agree with a plane which includes the first line and perpendicularly crosses the second line, and in this state, the light rays are recorded corresponding to the pixels of the image plane using the passing positions of the rotated light rays of the plane perpendicularly crossing the second line and directions of the light rays at that time.

15. An image processing apparatus according to claim 12, further comprising display means for displaying the generated image on a display screen.

16. An image processing method comprising the steps of:

inputting a plurality of images having different viewpoint positions as multi-viewpoint image data;

analyzing the input multi-viewpoint image data into a plurality of rays of light corresponding to pixels of the image data;

recording pixel data corresponding to each of the rays directed on each of image planes defined to be around an object, the image plane having an angle the plane makes with the ray of light;

inputting a viewpoint position and a direction of line of sight of a user;

selecting the image plane on the basis of a relation between an output of said viewpoint input step and a position of an object, calculating a position of a required scan line and a pixel position on the scan line in an arbitrary plane corresponding to the direction of the line of sight, and generating a desired image on the arbitrary plane on the basis of the pixel data and the pixel position;

copying the pixel data on the selected image plane to pixels corresponding to the desired image; and displaying the generated image on a display screen.

17. A method according to claim 16, wherein the image planes are arranged, so that the image planes cross each other on a first line passing through an object, angles adjacent planes make equal each other, and one of the image planes makes an angle half the angle adjacent image planes make with a second line which extends from the first line in a direction of an initial viewpoint position and perpendicularly crosses the first line.

18. A method according to claim 17, wherein light rays corresponding to pixels passing through the image plane are rotated through a rotation angle upon rotating the image plane to agree with a plane which includes the first line and perpendicularly crosses the second line, and in this state, the light rays are recorded corresponding to the pixels of the image plane using the passing positions of the rotated light rays of the plane perpendicularly crossing the second line and directions of the light rays at that time.

19. A method according to claim 16, wherein the image planes are defined to be around a real object.

* * * * *

UNITED STATES PATENT AND TRADEMARK OFFICE
CERTIFICATE OF CORRECTION

PATENT NO. : 6,445,807 B1　　　　　　　　　　　　　　　　　　　　　　　　Page 1 of 1
DATED : September 3, 2002
INVENTOR(S) : Akihiro Katayama et al.

It is certified that error appears in the above-identified patent and that said Letters Patent is hereby corrected as shown below:

Column 12,
Lines 64 and 65, "a" should be deleted.

Signed and Sealed this

Twenty-sixth Day of August, 2003

JAMES E. ROGAN
*Director of the United States Patent and Trademark Office*